(12) United States Patent
Himmel et al.

(10) Patent No.: US 6,889,054 B2
(45) Date of Patent: May 3, 2005

(54) METHOD AND SYSTEM FOR SCHEDULE BASED ADVERTISING ON A MOBILE PHONE

(75) Inventors: Maria A. Himmel, Yorktown Heights, NY (US); Herman Rodriguez, Austin, TX (US); Newton J. Smith, Jr., Austin, TX (US); Clifford J. Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 09/821,134

(22) Filed: Mar. 29, 2001

(65) Prior Publication Data

US 2003/0003929 A1 Jan. 2, 2003

(51) Int. Cl.[7] .................................................. H04Q 7/20
(52) U.S. Cl. .............................. 455/456.3; 455/456.3; 455/456.1; 455/414.1
(58) Field of Search ........................ 455/414.1, 414.2, 455/432.1, 436, 456.1, 456.3

(56) References Cited

U.S. PATENT DOCUMENTS

| | | | |
|---|---|---|---|
| 6,332,127 B1 | | 12/2001 | Bandera et al. |
| 6,484,148 B1 | | 11/2002 | Boyd |
| 6,647,269 B2 | * | 11/2003 | Hendrey et al. ........... 455/3.03 |
| 6,735,431 B1 | * | 5/2004 | Kiuchi et al. ............ 455/414.2 |
| 2001/0018340 A1 | * | 8/2001 | Tagi ............................ 455/414 |
| 2002/0095333 A1 | * | 7/2002 | Jokinen et al. ............... 705/14 |
| 2003/0050837 A1 | * | 3/2003 | Kim ............................. 705/14 |

OTHER PUBLICATIONS

An article entitled, "Ericsson Brings Ads To Mobile Phones", (Authors, Terho Uimonen, Jack Mccarthy, Info World, v22 n12, Dated Mar. 20, 2000, p. 54, COPYRIGHT 2000, InfoWorld Publishing Co.).
An article entitled Demand For Mobile Moves Ever Upwards (International Telecommunication Union Report) (Industry Trend Or Event), (Author, Joanne Taaffe, CommunciationsWeek International, Dated Oct. 4, 1999, p. 42, COPYRIGHT 1999 EMAP Media Ltd.).
An article entitled, "The Push Phone", (Author, Sebastian Rupley, PC Magazine, Dated Oct. 3, 2000, p. 71, COPYRIGHT 2000, Ziff–Davis Publishing Company).

* cited by examiner

*Primary Examiner*—Lester G. Kincaid
*Assistant Examiner*—Un C Cho
(74) *Attorney, Agent, or Firm*—Cardinal Law Group; Diana L. Gerhardt (57) ABSTRACT

A system for implementing a method for communicating an advertisement employs a primary call center, a mobile station, a base station, and an advertiser call center. When the mobile station is registered with the base station, the primary call center controls a transmission of one or more advertisements to the mobile station in accordance with a schedule preferred by the mobile station user with each advertisement matching a profile of the mobile station user. The mobile station user can either store the advertisement for future reference or respond to the advertisement. The response can be an acknowledgement of the advertisement or a desire to establish a communication link between the mobile station and the advertiser call center to thereby attempt a purchase of a good or a service. In response to an advertisement, the mobile station user is provided with a reward as an incentive to regularly receive advertisements.

51 Claims, 8 Drawing Sheets

METHOD AND SYSTEM FOR SCHEDULE BASED ADVERTISING ON A MOBILE PHONE

BACKGROUND OF THE INVENTION

1. Field of the Invention

The present invention generally relates to the advertising of goods and services. The present invention specifically relates to advertisements being communicated to mobile phone users.

2. Description of the Related Art

The mobile phone industry experienced tremendous growth during the 1990's. This growth facilitated an expansion in features available on a mobile phone. For example, mobile phones are now being sold with an Internet browser feature, an e-mail feature, and a Personal Data Assistant feature. It is inevitable that advertisers will "push" advertisements to mobile phone users, and as a result, mobile phones will need to be equipped with an advertising messaging feature. Any type of advertising messaging feature should balance an economic benefit for advertisers with a shopping advantage for mobile phone users. Additionally, a convenient communication mode with the mobile phone users must be established, while any risk of economically burdening mobile phone users should be minimized, if not eliminated. What is therefore needed is a system for implementing a method that intelligently communicates advertisements of goods and services to mobile phone users in a manner that is acceptable to both mobile phone users and advertisers. In particular, what is needed is a communication mode based on a schedule and preferences of a mobile phone user with an incentive for the mobile phone user to regularly accept and respond to advertisements.

SUMMARY OF THE INVENTION

The present invention is a method and system for schedule and user preference based advertisements on a mobile phone that can provide an incentive for mobile phone users to regularly accept and respond to advertisements. Various aspects of the invention are novel, non-obvious, and provide various advantages. While the actual nature of the present invention covered herein can only be determined with reference to the claims appended hereto, certain features, which are characteristic of the embodiments disclosed herein, are described briefly as follows.

One form of the present invention is a first method for communicating an advertisement to a mobile station (e.g., a mobile phone). A registration of the mobile station with a base station (e.g., a tower) is detected. A user preferred schedule for transmitting advertisements to the mobile station is initiated subsequent to a detection of the registration. And, an advertisement is transmitted to the mobile station in accordance with the user preferred schedule.

A second form of the present invention is a second method for communicating an advertisement to a mobile station. An advertisement is transmitted to the mobile station subsequent to a registration of the mobile station with a base station. And, a reception of the advertisement by the mobile station is verified in response to a reception of a responsive command from the mobile station.

A third form of the present invention is a system comprising a mobile station and a computer (e.g., a computer telephony server). The mobile station is operable to register with a base station. In a first aspect of the system, the computer is operable to detect a registration of the mobile station with the base station. The computer further include means for initiating a user preferred schedule for transmitting advertisements to the mobile station subsequent to the registration detection, and means for controlling a transmission of an advertisement in accordance with the schedule.

"In a second aspect of the system, the computer is operable to control a transmission of an advertisement to the mobile station. The computer also includes means for verifying a reception of the advertisement by the mobile station in response to a reception of a responsive command from the mobile station."

A fourth form of the present invention is a computer program product in a computer readable medium for communicating an advertisement to a mobile station. In a first aspect, the computer program product comprises computer readable code for detecting a registration of the mobile station with a base station, computer readable code for initiating a user preferred schedule for transmitting advertisements to the mobile station subsequent to the registration detection, and computer readable code for controlling a transmission of an advertisement in accordance with the schedule.

In a second aspect, the computer program product comprises computer readable code for controlling a transmission of an advertisement to the mobile station, and computer readable code for verifying a reception of the advertisement by the mobile station in response to a reception of a responsive command from the mobile station.

The foregoing forms and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
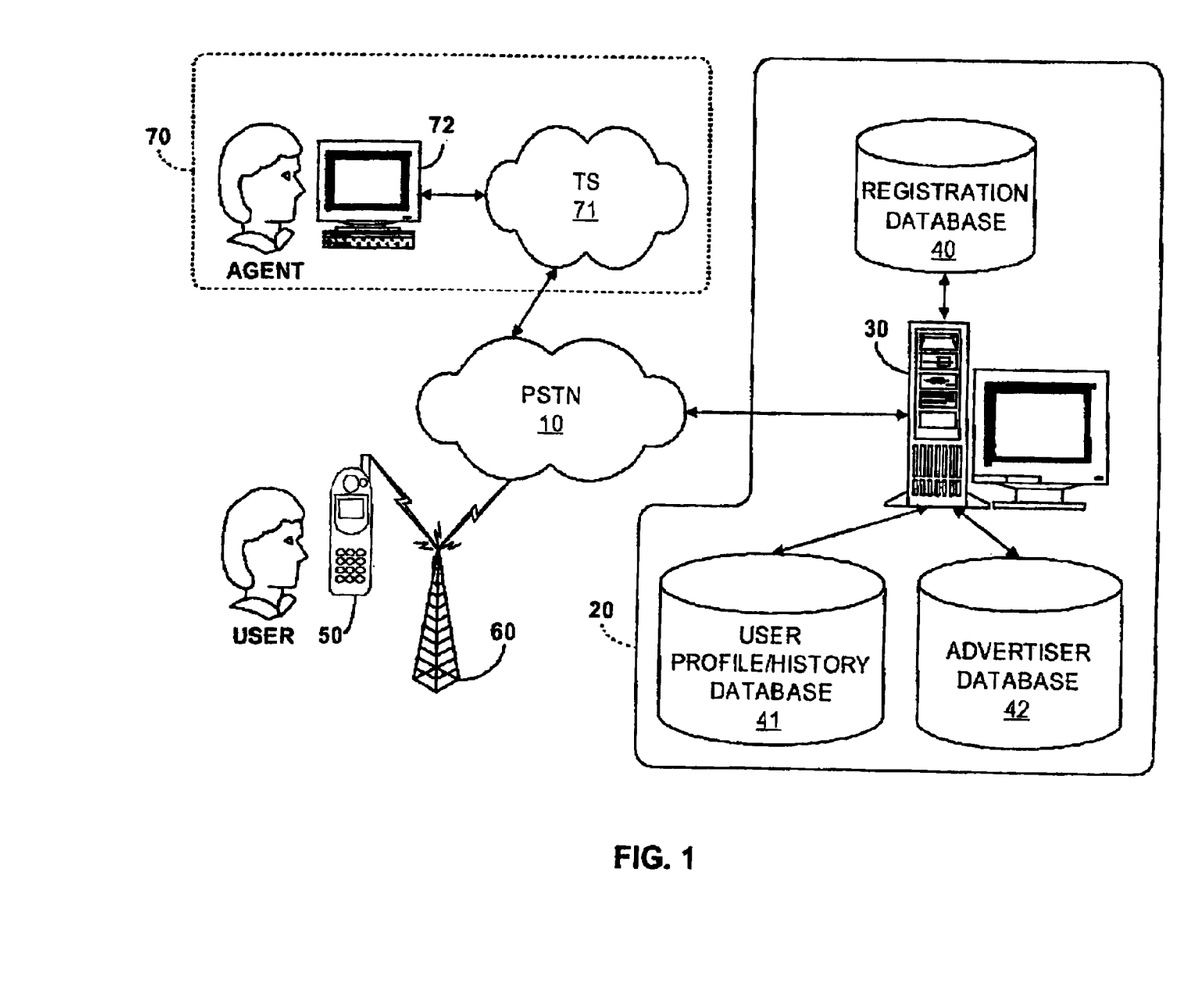
FIG. 1 is a schematic diagram of one embodiment of hardware employed in a telecommunication system of the present invention.

Referring to FIG. 1, a telecommunication system of the present invention is shown. The system comprises a conventional public switched telephone network (PSTN) 10, a primary call center 20, a mobile station in the form of a mobile phone 50, a base station 60, and an advertiser call center 70. The system can comprise additional primary call centers 20, mobile phones 50, base stations 60, and/or advertiser call centers 70.

Call center 20 includes a computer telephony (CT) server 30, a registration database 40, a user profile/history database 41, and an advertiser database 42. CT server 30 may have a permanent communication link to PSTN 10 as shown, such as, for example, by a wire or fiber optic cable connection. Alternatively, PSTN 10 and CT server 30 may have a temporary communication link, such as, for example, by a wireless communication. CT server 30 has a permanent communication link to databases 40–42 as shown.

Figure 2:
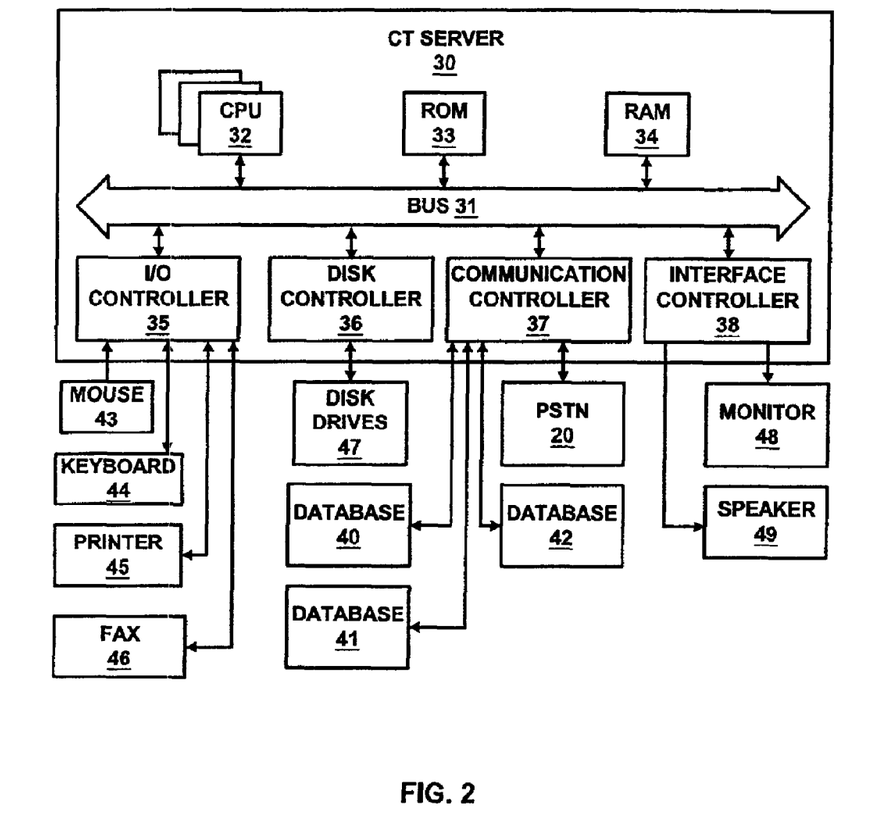
FIG. 2 is a block diagram of one embodiment in accordance with the present invention of computer hardware employed in a primary call center of the FIG. 1 system.

CT server 30 may be configured in any form for accepting structured inputs, processing the inputs in accordance with prescribed rules, and outputting the processing results as would occur to those having ordinary skill in the art, such as, for example, a personal computer, a workstation, a super computer, a mainframe computer, a minicomputer, a super minicomputer, or a microcomputer. Referring additionally to FIG. 2, CT server 30 preferably includes a bus 31 for facilitating electrical communication among one or more central processing units (CPU) 32, a read-only memory (ROM) 33, a random access memory (RAM) 34, an input/output (I/O) controller 35, a disk controller 36, a communication controller 37, and a user interface controller 38.

Each CPU 32 is preferably one of the Intel families of microprocessors, one of the AMD families of microprocessors, one of the Motorola families of microprocessors, or one of the various versions of a Reduced Instruction Set Computer microprocessor such as the PowerPC chip manufactured by IBM. ROM 33 permanently stores various controlling programs such as the Basic Input-Output System (BIOS) developed by IBM. RAM 34 is the memory for loading an operating system and selectively loading the controlling programs.

Controller 35 is an aggregate of conventional controllers for facilitating an interaction between CPU 32 and pointing devices such as a mouse 43 and a keyboard 44, and between CPU 32 and output devices such as a printer 45 and a fax 46. Controller 36 is an aggregate of conventional controllers for facilitating an interaction between CPU 32 and data storage devices such as disks drives 47 in the form of a hard drive, a floppy drive, and a compact-disc drive that are locally or remotely situated. The hard drive stores a conventional operating system, such as, for example, IBM's AIX operating system or Microsoft's Windows, and application programs.

Controller 37 is an aggregate of conventional controllers for facilitating an interaction between CPU 32 and PSTN 10 as well as between CPU 32 and registration database 40, CPU 32 and user profile/history database 41, and CPU 32 and advertiser database 42. Controller 38 is an aggregate of conventional controllers for facilitating an interaction between CPU 32 and a graphic display device such as a monitor 48, and between CPU 32 and an audio device such as a speaker 49.

Those having ordinary skill in the art will appreciate alternative embodiments of CT server 30 for implementing the principles of the present invention.

Figure 3:
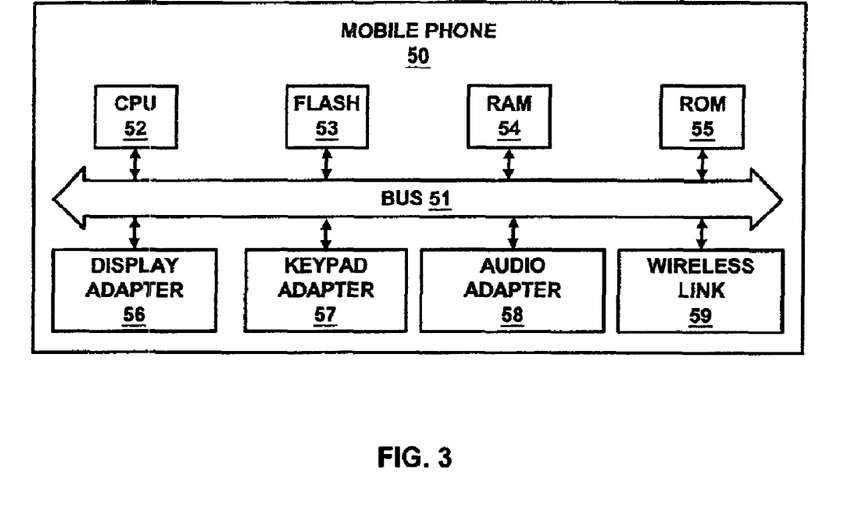
FIG. 3 is a block diagram of one embodiment in accordance with the present invention of hardware employed in a mobile phone of the FIG. 1 system.

Referring still to FIG. 1, mobile phone 50 may be configured in any form as those having ordinary skill in the art will appreciate. Referring additionally to FIG. 3, mobile phone 50 preferably includes a bus 51 for facilitating electrical communication among a central processing unit (CPU) 52, a flash memory (FLASH) 53, a random access memory (RAM) 54, a read-only memory 55, a display adapter 56, a keypad adapter 57, an audio adapter 58, and a wireless link 59 including a transmitter (not shown), a receiver (not shown), and an antenna (not shown).

As with each CPU 32 (FIG. 2), CPU 52 is preferably one of the Intel families of microprocessors, one of the AMD families of microprocessors, one of the Motorola families of microprocessors, or one of the various versions of a Reduced Instruction Set Computer microprocessor such as the PowerPC chip manufactured by IBM. FLASH 53 stores a conventional operating system, such as Windows CE or Palm OS, and application programs. FLASH 53 or ROM 55 can store various controlling programs such as the Basic Input-Output System (BIOS). RAM 54 is the memory for loading the operating system and selectively loading the controlling programs.

Those having ordinary skill in the art will appreciate alternative embodiments of mobile phone 50 for implementing the principles of the present invention. Those having ordinary skill in the art will also appreciate alternative embodiments of a mobile station for implementing the principles of the present invention, such as, for example, a laptop computer, a Personal Data Assistant, etc.

Referring again to FIG. 1, base station 60 may be configured in any form of a conventional system for establishing and registering a communication link with mobile phone 50 when detecting mobile phone 50 is activated (i.e., mobile phone 50 is powered on) within a distinct service area. PSTN 10 and base station 60 may have a permanent communication link, or alternatively, PSTN 10 and base station 60 may have a temporary communication link as shown.

Referring still to FIG. 1, call center 70 includes a conventional telecommunication switch (TS) 71, a computer telephony server (not shown) and one or more telecommunication devices, such as, for example, a switchboard, a phone, or an agent workstation 72 as shown. PSTN 10 and switch 71 may have a permanent communication link as shown, or alternatively, PSTN 10 and switch 71 may have a temporary communication link. Switch 71 has a permanently established communication link to agent workstation 72 as shown.

Figure 4:
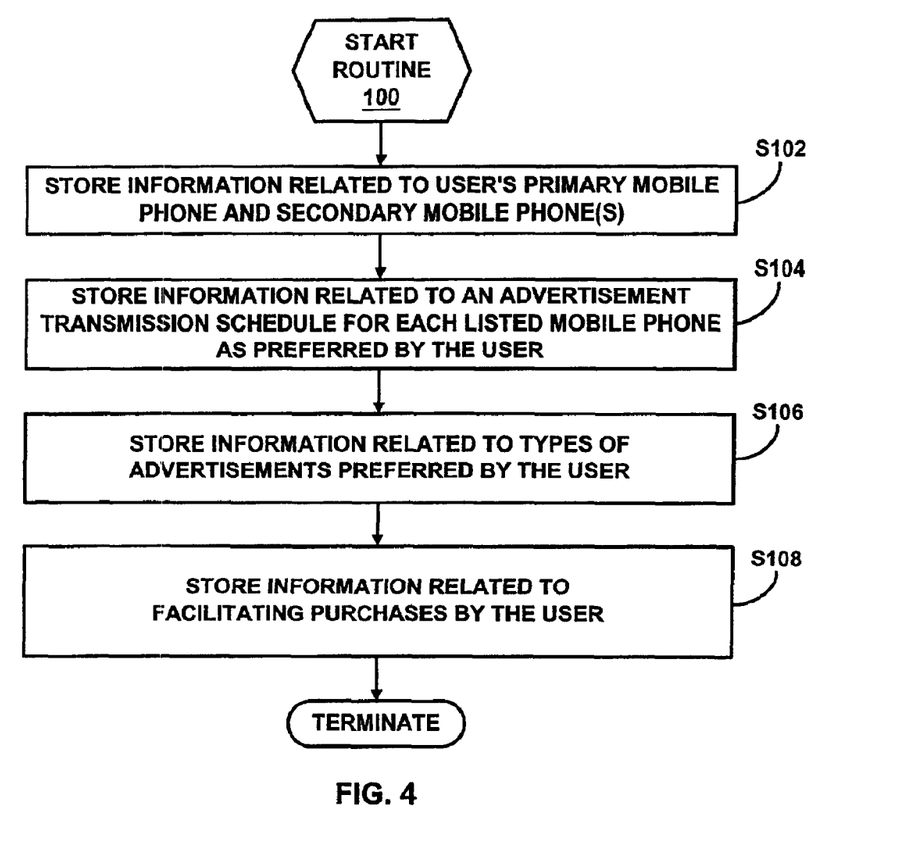
FIG. 4 illustrates a flow chart of one embodiment in accordance with the present invention of a user profiling routine.

User profile/history database 41 includes one or more exemplary rows of data representative of information related to users of mobile stations within the telecommunication system that have granted authorization for call center 20 to "push" advertisements to their respective mobile stations. In one embodiment, call center 20 utilizes a user profiling routine 100 as shown in FIG. 4 to generate and store a user profile within database 41 for the user of mobile phone 50. Accordingly, to gather user information, call center 20 can offer personal interviews (e.g., face-to-face or telephonically), or accept applications via walk-ins, the mail system, a telephone or an Internet website.

Referring additionally to FIG. 4, during a stage S102 of routine 100, information related to mobile phone 50 as well as any secondary mobile phones for receiving advertisements is stored within database 41. The following TABLE 1 illustrates an exemplary row of stage S102 information coded and stored within user profile/history database 41 that corresponds to the user of mobile phone 50:

TABLE 1

| PRIMARY MOBILE PHONE | RECEIVE ADS | SECONDARY MOBILE PHONE | RECEIVE ADS |
|---|---|---|---|
| 50 | Yes | Spouse's Mobile Phone | Yes (Weekends) |

During a stage S104 of routine 100, information related to an advertisement transmission schedule for each listed mobile station as preferred by the user of mobile phone 50 is stored within database 41. The following TABLE 2 illustrates an exemplary row of stage S104 information coded and storied within user profile/history database 41 that corresponds to the user of mobile phone 50:

TABLE 2

| PRIMARY TRANSMISSION SCHEDULE | SECONDARY TRANSMISSION SCHEDULE |
|---|---|
| Upon Registration Only; Every Hour Thereafter | Upon Registration |

An entry of "default" can be coded and stored within database 41 when the user of mobile phone 50 prefers to receive advertisements on either mobile phone in accordance with a default scheduled fixed by call center 20.

During a stage S106 of routine 100, information related to the types of advertisements preferred by the user of mobile phone 50 is stored within user profile/history database 41. The following TABLE 3 illustrates an exemplary row of stage S106 information coded and stored within user profile/history database 41 that corresponds to the user of mobile phone 50:

TABLE 3

| PRIMARY INTEREST | SECONDARY INTERST |
|---|---|
| Sports Clothing And Memorabilia | Automobiles And Accessories |

During a stage S108 of routine 100, information related to a facilitation of purchases by the user of mobile phone 50 is stored within user profile/history database 41. The following TABLE 4 illustrates an exemplary row of stage S108 information coded and stored within user profile/history database 41 that corresponds to the user of mobile phone 50:

TABLE 4

| PIN NO. | CREDIT CARD | SHIPPING ADDRESS |
|---|---|---|
| xxxxxxxxx | MasterCard xxxx-xxxx-xxxx-xxxx; Expiration Month/Year | Street; City, State; Zip Code |

Routine 100 is terminated upon completion of stage S108. The user of mobile phone 50 however can direct an editing of any information stored within database 41. For example, the user of mobile phone 50 may desire to change the advertisement transmission schedule for mobile phone 50. The user of mobile phone 50 can provide a schedule change to authorized personnel of call center 20, can input a schedule change to database 41 by utilizing telephone dial keys of mobile phone 50 or providing vocal commands via mobile phone 50 to CT server 30, or can input a schedule change to database 41 via an Internet website established by call center 20.

Referring to FIG. 1, advertiser database 42 includes rows of data representative of information related to a demographic of advertisers as well as the goods and/or services sold by advertisers. For purposes of matching locations of mobile phone users and advertisers, the base station serving the area in which the advertiser is located is also listed in advertiser database 42. The following TABLE 5 illustrates an exemplary row of an advertiser information within advertiser database 42 with information related to the advertiser of call center 70:

TABLE 5

| ADVERTISER | PHONE NO. | LOCATION | GOODS/ SERVICES | BASE STATION |
|---|---|---|---|---|
| 70 | (xxx) xxx-xxx | Street; City, State; Zip Code | Sports Clothing | 60 |

Figure 5:
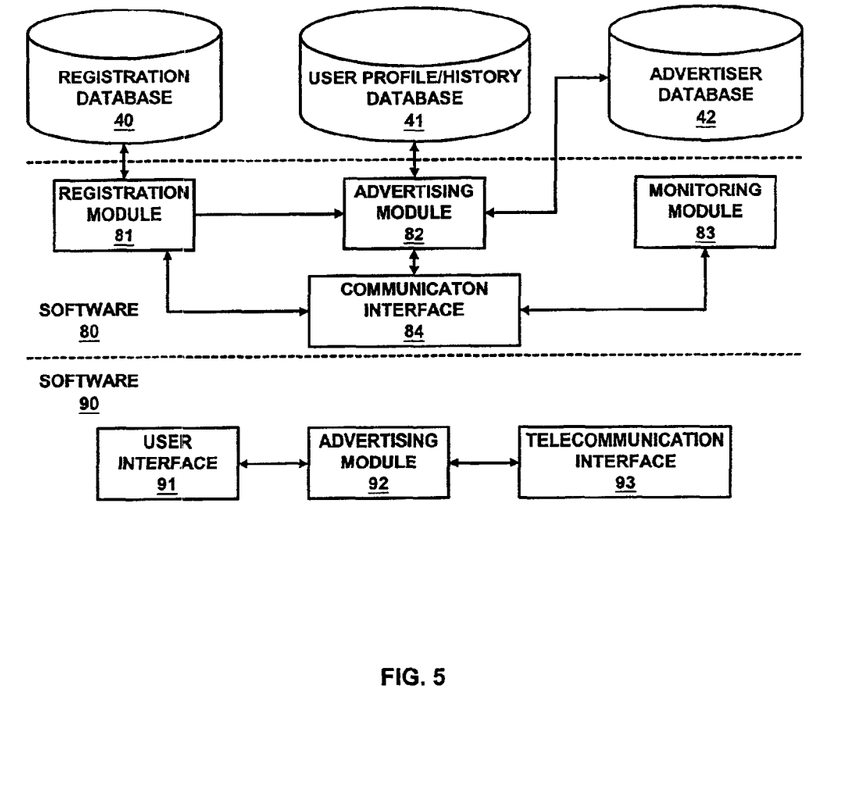
FIG. 5 is a block diagram of one embodiment in accordance with the present invention of computer software employed in the FIGS. 2 and 3 hardware.

Referring to FIGS. 2 and 5, CT server 30 includes software 80 as will be subsequently described herein in connection with FIG. 6. Software 80 is physically stored within the hard drive of disk drives 47 and uploaded to RAM 34 whereby the hard drive and RAM 34 are computer readable mediums that are electrically, magnetically, optically, or chemically altered to carry computer readable code for implementing software 80. In other embodiments of CT server 30, software 80 can be stored and downloaded from other computer readable mediums such as, for example, from another disk drive 47. Also in other embodiments of CT server 30, software 80 can be partially or fully implemented with digital circuitry, analog circuitry, or both. CT server 30 can additionally include software (not shown) as would occur to those having ordinary skill in the art for establishing an Internet website.

Referring to FIGS. 3 and 5, mobile phone 50 includes software 90 as will be subsequently described herein in connection with FIG. 6. Software 90 is physically stored within FLASH 53 or ROM 55, and uploaded to RAM 54 whereby FLASH 53, RAM 54, and/or ROM 55 are computer readable mediums that are electrically, magnetically, optically, or chemically altered to carry computer readable code for implementing software 90. In other embodiments of mobile phone 50, software 90 can be partially or fully implemented with digital circuitry, analog circuitry, or both. Mobile phone 50 can additionally include software (not shown) as would occur to those having ordinary skill in the art for browsing any Internet website established by CT server 30.

Figure 6:
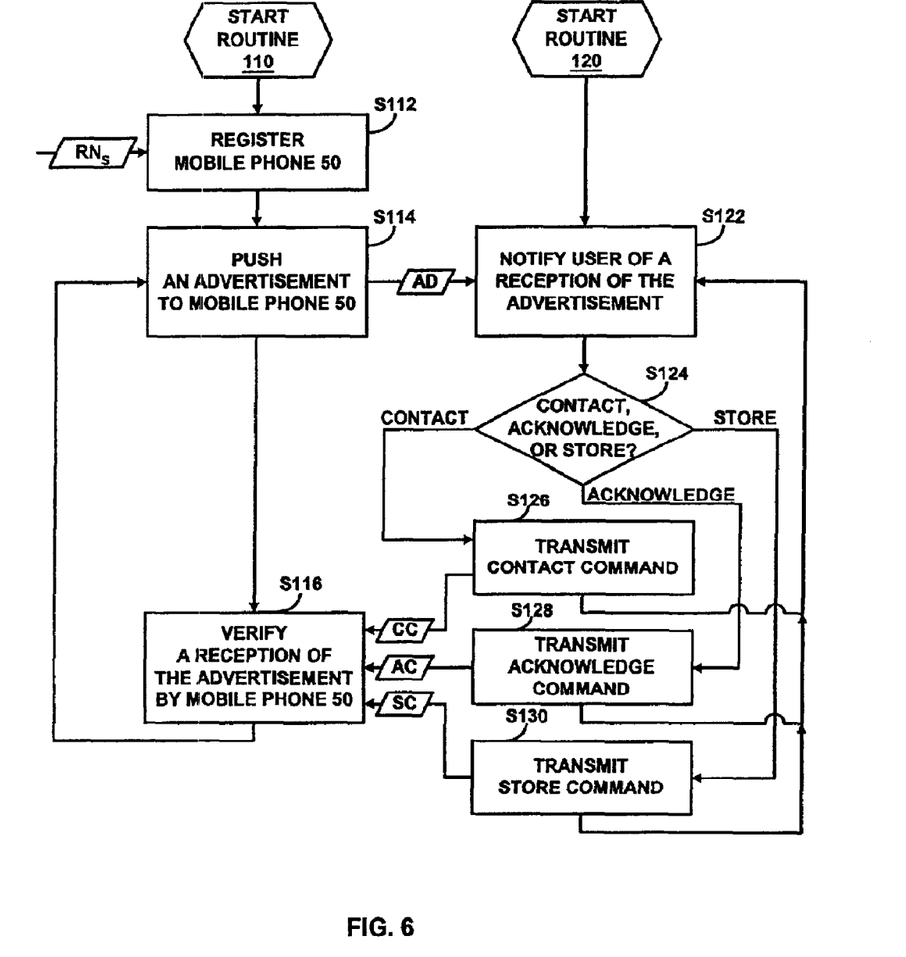
FIG. 6 illustrates flow charts of one embodiment in accordance with the present invention of a pair of complementary push advertising routines that are implemented by the FIG. 5 computer software.

Referring to FIG. 5, software 80 includes a conventional registration module 81, an advertising module 82, a monitoring module 83, and a conventional communication interface 84 for implementing a routine 110 as shown in FIG. 6. And, software 90 includes a conventional user interface 91, an advertising module 92, and a telecommunication interface 93 for implementing a routine 120 as shown in FIG. 6. For purposes of understanding the principles of the present invention, a description of the interaction among software 80, software 90, registration database 40, user profile/history database 41, advertiser database 42, base station 60 (FIG. 1), and agent workstation 72 (FIG. 1) will now be described herein.

Referring to FIGS. 1, 5, and 6, during a stage S112 of routine 110, module 81 of software 80 registers mobile phone 50 within database 40 in response to a reception of registration notification signal $RN_S$ by communication interface 84 from base station 60. Registration notification signal $RN_S$ indicates mobile phone 50 has been formally registered with base station 60 as would occur to those having ordinary skill in the art. The following TABLE 6 illustrates an exemplary row within registration database 40 with mobile phone 50 being registered with base station 60:

TABLE 6

| MOBILE STATION | BASE STATION(S) | REGISTRATION DAY AND DATE | REGISTRATION TIME |
| --- | --- | --- | --- |
| 50 | 60 | Weekday; Day, Month | xx:yy.zz |

Those having ordinary skill in the art will appreciate that base station 60 is operational over a distinct service area, and a corresponding listing of base station 60 with mobile phone 50 within database 40 indicates mobile phone 50 is located within the service area of base station 60. Mobile phone 50 can be located within a service area of a different base station (not shown), and thus any corresponding listing of a different base station with mobile phone 50 within database 40 indicates mobile phone 50 is located within the service area of that particular base station. Additionally, mobile phone 50 can be located within the service area of base station 60 while being situated within a handoff zone between base station 60 and another base station. As such, any listing of base station 60 and a second base station with mobile phone 50 within database 40 indicates a potential handoff between base station 60 and the second base station. The information related to any potential handoff from base station 60 to the second base station can be utilized when selecting advertisements to transmit to mobile phone 50 as will be further described herein in connection with FIG. 7.

During a stage S114 of routine 110, module 82 of software 80 directs a transmission of an advertisement to mobile phone 50. In one embodiment, module 82 implements a routine 140 as shown in FIG. 7 during stage S114.

Figure 7:
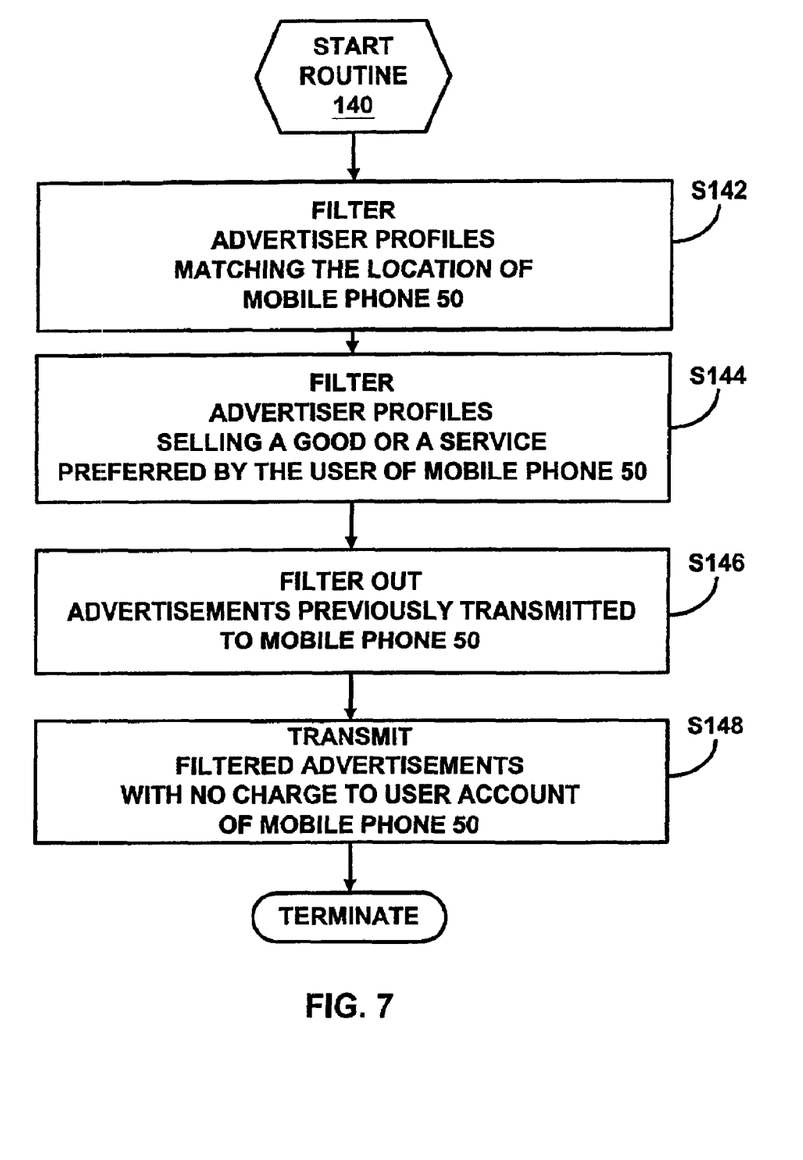
FIG. 7 illustrates a flow chart of one embodiment in accordance with the present invention of an advertisement transmission subroutine of the FIG. 6 routines.

"Referring additonally to FIG. 7, during a stage S142 of routine 140, module 82 filters advertiser profiles from database 42 having a similar location as mobile phone 50. In one embodiment, module 82 determines the location of mobile phone 50 as being within the service area of base station 60 by reading the corresponding data row of database 40. Module 82 then sorts through the data rows of database 42 to compile a listing of each advertiser within the service area of the base station 60 and/or the service area of any potential handoff base station."

During a stage S144 of routine 140, module 82 filters the listed advertiser profiles compiled during stage S142 that match the user profile of the user of mobile phone 50. In one embodiment, module 82 sorts through the data rows of database 41 to compile a listing of each advertiser offering a good or a service that matches the primary interest or secondary interest of the user of mobile phone 50 as listed in database 41.

During a stage S146 of routine 140, module 82 filters advertisements from the listed advertiser profiles compiled during stage S144 that have been previously transmitted to the user of mobile phone 50. In one embodiment, database 42 lists an advertisement identification with each advertisement offered by advertiser and database 40 lists each advertisement previously received by a mobile station user.

The following TABLE 7 illustrates an exemplary row of an advertisement identifications within advertiser database 42 with information related to the advertiser of call center 70:

TABLE 7

| ADVERTISER | FIRST ADVERTISEMENT | SECOND ADVERTISEMENT | THIRD ADVERTISEMENT |
| --- | --- | --- | --- |
| 70 | 70-0000001 | 70-0000002 | N/A |

The following TABLE 8 illustrates an exemplary row of database 41 indicating advertisements previously transmitted to the user of mobile phone 50:

TABLE 8

| MOBILE STATION | FIRST ADVERTISEMENT | SECOND ADVERTISEMENT | THIRD ADVERTISEMENT |
| --- | --- | --- | --- |
| 50 | 70-0000001 | N/A | N/A |

Module 82 will sort through database 41 and database 42 to compile a final list of new advertisements matching preferences of the user of mobile phone 50.

During a stage S148 of routine 140, module 82 directs a transmission of filtered advertisements compiled during stage S146 to mobile phone 50 with no charge to the account of the user of mobile phone 50, such as, for example, an advertisement AD corresponding to advertisement identification 70-0000002 as shown in TABLES 7 and 8. The transmission of advertisement AD is from a storage location of call center 20 or call center 70, and is in accordance with the corresponding advertisement transmission schedule in database 41. In one embodiment, module 82 utilizes the registration day, date and/or time as stored in database 40 when initiating and adhering to the preferred advertisement transmission schedule of the user of mobile phone 50.

Referring again to FIGS. 1, 5 and 6, during a stage S122 of routine 120, interface 91 of software 90 notifies the user of mobile phone 50 of the reception of advertisement AD by interface 93. In one embodiment, call center 20 specifically designs and offers specials mobile phones, such as mobile phone 50, to initially beep or vibrate to gain the attention of the user. The mobile phones can be equipped with a high quality color display for displaying advertisements in text form or graphic form via a telephone or web site of call center 20. Alternatively or concurrently, the mobile phones can be equipped with a high quality audio adapter, speaker or head phones for providing high quality audio presentations of advertisements.

During a stage S124 of routine 120, module 92 of software 90 ascertains whether the user of mobile phone 50 desires to contact call center 70, acknowledge advertisement AD, and/or store advertisement AD. In one embodiment, to input a contact command CC indicating a desire to have a communication link established between mobile phone 50 and call center 70, the user of mobile phone 50 can press the pound (#) key or a contact key combination as embedded in advertisement AD. To input an acknowledge command AC indicating an acknowledgment of advertisement AD, the user of mobile phone 50 can press the star (*) key or an acknowledgement key combination as embedded in advertisement AD. To input a store command SC indicating a desire to store advertisement AD, the user of mobile phone 50 can press the key "7" having letter inscription "S" for storing, or a storage key combination as embedded in advertisement AD. Advertisement AD can be stored within mobile phone 50, database 41, and/or transmitted to a personal e-mail account of the user of mobile phone 50.

When the user of mobile phone 50 inputs contact command CC, module 92 of software 90 proceeds to a stage S126 of routine 120 to control a transmission of the contact command CC via interface 93 to interface 84. When the user of mobile phone 50 inputs acknowledge command AC, module 92 proceeds to a stage S128 of routine 120 to control a transmission of the acknowledge command AC via interface 93 to interface 84. When the user of mobile phone 50 inputs store command SC, module 92 proceeds to a stage S130 of routine 120 to control a transmission of store command SC via interface 93 to interface 84.

In response to a reception of contact command CC, acknowledge command AC or store command SC, module 83 of software 80 verifies the reception of advertisement AD by mobile phone 50 during a stage S116 of routine 110. In one embodiment, module 83 implements a routine 150 as shown in FIG. 8 during stage S116.

Figure 8:
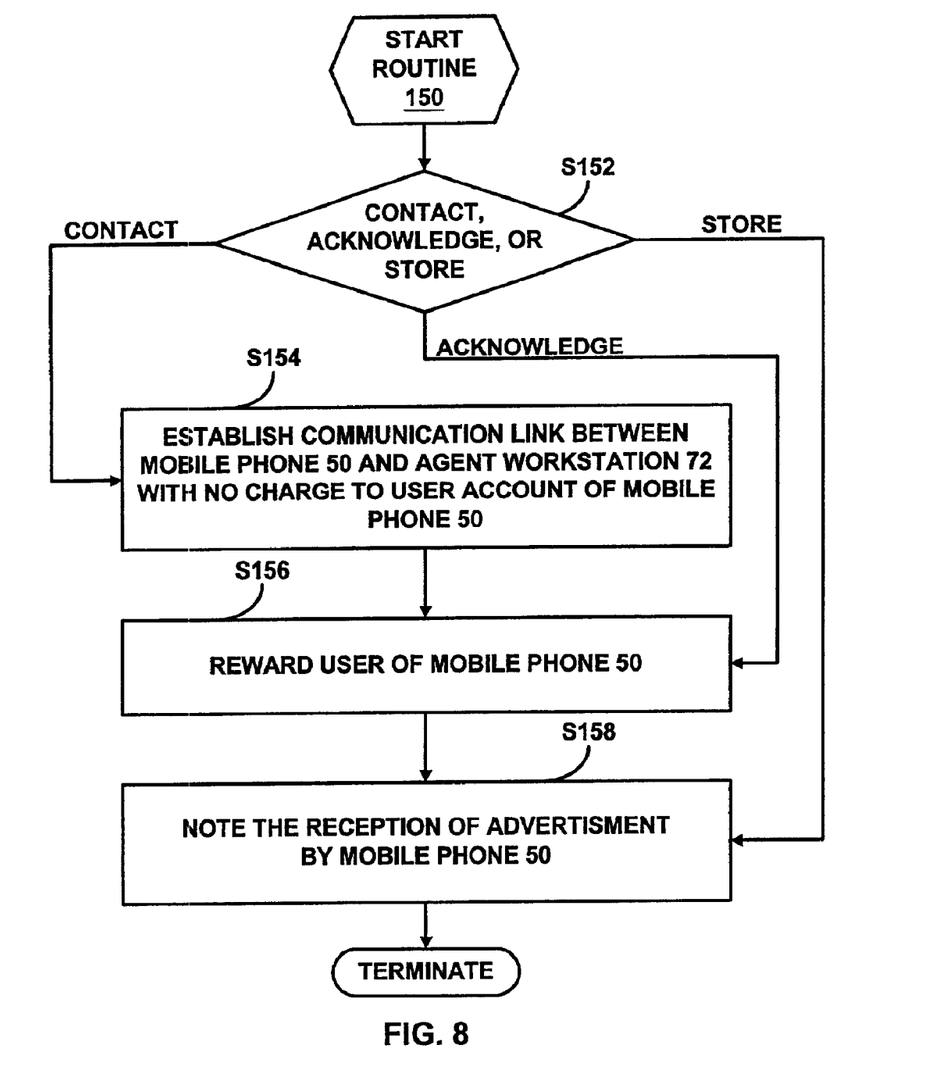
FIG. 8 illustrates a flow chart of one embodiment in accordance with the present invention of a reception verification subroutine of the FIG. 6 routines.

Referring additionally to FIG. 8, module 83 proceeds to a stage S154 of routine 50 when receiving contact command CC during a stage S152 of routine 150. During stage S154, module 83 controls an establishment of a communication link between mobile phone 50 and agent workstation 72 with no charge to the account of the user of mobile phone 50. In one embodiment, the advertiser of call center 70 can have access to the user profile within database 41 to facilitate a purchase of a good or a service.

Module 83 thereafter proceeds to stage S156 to reward the user of mobile phone 50 for responding to advertisement AD. The user of mobile phone 50 can be rewarded in many ways. For example, the user can be rewarded with free phone minutes if the user is on a fixed minute allotment pay plan. The user can be rewarded with a cash credit toward the phone bill for mobile phone 50 and/or any associated telecommunication device like a home phone bill. Also, if the communication link between mobile phone 50 and agent workstation 72 results in a purchase of a good or a service, the user can be rewarded with additional free minutes and/or a larger cash credit.

Module 83 proceeds to stage S156 of routine 50 to reward the user of mobile phone 50 when receiving acknowledge command AC during stage S152. The reward for acknowledging advertisement AD can be identical or different than the reward offered for wanting to contact the advertiser. For example, the amount of free minutes and/or cash credit can be less when module 83 receives acknowledge command AC as opposed to receiving contact command CC.

Module 83 proceeds to an optional stage S158 of routine 50 when receiving store command SC during stage S154 of routine 150 or after an execution of stage S156. During stage S158, module 83 can note a reception of advertisement AD by mobile phone 50. In one embodiment, module 83 updates a status, report for call center 70 that indicates the type of response by mobile phone 50 to advertisement AD.

Referring to FIGS. 5 and 6, while continually receiving registration notification signal $RN_S$, software 80 returns to stage S114 to cycle through stage S114 and stage S116 in accordance with the preferred schedule of the user of mobile phone 50. Also, after transmitting the appropriate command, software 90 will return to stage S122 to await any subsequent advertisements.

Referring to FIGS. 1–8, numerous advantages of the present invention for the user of mobile phone 50 and the advertiser of call center 70 have been explicitly and implicitly described herein. In summary, for the user of mobile phone 50, a first advantage is the ability to grant authorization to call center 20 to have advertisements pushed to mobile phone 50 and/or secondary mobile stations with no charge to the account of the user of mobile phone 50. A second advantage is the reception of advertisements in accordance with a preferred schedule. A third advantage is a convenient mode of calling the advertiser of call center 70 to discuss or execute a potential purchase of a good or a service offered by the advertiser with no charge to the account of the user of mobile phone 50. A fourth advantage is an identification of a near-by store location of call center 70 whereby the user can conveniently visit the store location to purchase a good or a service from the advertiser. A fifth advantage is being rewarded with free minutes and/or cash credits for responding to the advertisements.

For the advertiser of call center 70, a first advantage is a passive and economic manner of advertising goods and services. A second advantage is an immediate response mechanism for making sales of goods and services. A third advantage is a convenient execution of purchases with the ability to retrieve user information such as credit card and shipping address.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method for communicating an advertisement to a mobile station, said method comprising:

detecting a registration of the mobile station with a base station;

initiating a user preferred schedule for pushing advertisements to the mobile station subsequent to a detection of the registration;

determining a first service area of the base station;

determining a second service area of any potential handoff base station;

matching a location of an advertiser represented in the advertisement with the first service area or the second service area; and pushing the advertisement to the mobile station in accordance with the user preferred schedule.

2. The method of claim 1, further comprising:

verifying a reception of the advertisement by the mobile station in response to a reception of a responsive command from the mobile station that indicates a reception of the advertisement by the mobile station.

3. The method of claim 1, further comprising:

rewarding a user of the mobile station in response to a responsive command from the mobile station that indicates a reception of the advertisement by the mobile station.

4. The method of claim 1, further comprising:

establishing a communication link between the mobile station and a telecommunication device associated with an advertiser represented in the advertisement in response to a reception of a contact command indicating a desire of a user of the mobile station for an establishment of the communication link.

5. The method of claim 4, further comprising:

rewarding a user of the mobile station when an establishment of the communication link results in a purchase of a good or a service from the advertiser.

6. The method of claim 1, further comprising:
providing a credit to an account of the user of the mobile station when pushing the advertisement to the mobile station.

7. The method of claim 1, further comprising:
determining a location of the mobile station; and
matching a location of an advertiser represented in the advertisement with the location of the mobile station.

8. The method of claim 1, further comprising:
retrieving a user profile corresponding to the mobile station; and
matching a good or a service represented in the advertisement with the user profile.

9. The method of claim 1, further comprising:
compiling a list of advertisements previously pushed to mobile station prior to pushing the advertisement to the mobile station.
wherein the advertisement is pushed to the mobile station when the advertisement is absent from the list of advertisements.

10. A system, comprising:
a mobile station operable to register with a base station; and
a computer operable to detect a registration of said mobile station with the base station, wherein the computer includes
means for initiating a user preferred schedule for pushing advertisements to said mobile station subsequent to the registration detection,
means for determining a first service area of the base station and a second service area of any potential handoff station.
means for matching a location of an advertiser represented in the advertisement with the first service area or the second service area, and
means for controlling a push of an advertisement in accordance with the schedule.

11. The system of claim 10, wherein
said mobile station includes means for transmitting a responsive command in response to a reception of the advertisement; and
said computer further includes means for verifying a reception of the advertisement by said mobile station in response to a reception of said responsive command from said mobile station.

12. The system of claim 10, wherein
said mobile station includes means for transmitting a responsive command in response to a reception of the advertisement; and
said computer further includes means for rewarding a user of said mobile station in response to said responsive command from said mobile station.

13. The system of claim 10, wherein
said mobile station includes means for transmitting a responsive command in response to a reception of the advertisement; and
said computer further includes means for establishing a communication link between said mobile station and a telecommunication device associated with an advertiser represented in the advertisement in response to a reception of said responsive command.

14. The system of claim 13, wherein
said computer further includes means for rewarding a user of said mobile station when an establishment of the communication link results in a purchase of a good or a service from the advertiser.

15. The system of claim 10, wherein
said computer further includes means for providing a credit to an account of a user of said mobile station when pushing the advertisement to said mobile station.

16. The system of claim 10, wherein
said computer further includes means for determining a location of said mobile station; and
said computer further includes means for matching a location of an advertiser represented in the advertisement with the location of said mobile station.

17. The system of claim 10, wherein
said computer further includes means for retrieving a user profile corresponding to said mobile station; and
said computer further includes means for matching a good or a service represented in the advertisement with the user profile.

18. The system of claim 10, wherein
said computer further includes means for compiling a list of advertisements previously pushed to said mobile station prior to pushing the advertisement to said mobile station.

19. A computer program product in a computer readable medium for communicating an advertisement to a mobile station, said computer program product comprising:
computer readable code for detecting a registration of the mobile station with a base station;
computer readable code for initiating a user preferred schedule for pushing advertisements to the mobile station subsequent to the registration detection;
computer readable code for determining a first service area of the base station and a second service area of any potential handoff base station;
computer readable code for matching a location of an advertiser represented in the advertisement with the first service area or the second service area; and
computer readable code for controlling a push of an advertisement in accordance with the schedule.

20. The computer program product of claim 19, further comprising:
computer readable code for verifying a reception of the advertisement by the mobile station in response to a reception of a responsive command from the mobile station that indicates a reception of the advertisement by the mobile station.

21. The computer program product of claim 19, further comprising:
computer readable code for rewarding a user of the mobile station in response to a responsive command from the mobile station that indicates a reception of the advertisement by the mobile station.

22. The computer program product of claim 19, further comprising:
computer readable code for establishing a communication link between the mobile station and a telecommunication device associated with an advertiser represented in the advertisement in response to a reception of a contact command indicating a desire of a user of the mobile station for an establishment of the communication link.

23. The computer program product of claim 22, further comprising:
computer readable code for rewarding a user of the mobile station when an establishment of the communication link results in a purchase of a good or a service from the advertiser.

24. The computer program product of claim 19, further comprising:
computer readable code for providing a credit to an account of a user of the mobile station when pushing the advertisement to the mobile station.

25. The computer program product of claim 19, further comprising:
computer readable code for determining a location of said mobile station; and computer readable code for matching a location of an advertiser represented in the advertisement with the location of said mobile station.

26. The computer program product of claim 19, further comprising:
computer readable code for retrieving a user profile corresponding to said mobile station; and
computer readable code for matching a good or a service represented in the advertisement with the user profile.

27. The computer program product of claim 19, further comprising:
computer readable code for compiling a list of advertisements previously pushed to said mobile station prior to pushing the advertisement to said mobile station.

28. A method for communicating an advertisement to a mobile station, said method comprising:
detecting a registration of the mobile station with a base station;
initiating a user preferred schedule for pushing advertisements to the mobile station subsequent to a detection of the registration;
compiling a list of advertisements previously pushed to mobile station prior to pushing the advertisement to the mobile station,
pushing the advertisement to the mobile station in accordance with the user preferred schedule when the advertisement is absent from the list of advertisements.

29. The method of claim 28, further comprising:
verifying a reception of the advertisement by the mobile station in response to a reception of a responsive command from the mobile station that indicates a reception of the advertisement by the mobile station.

30. The method of claim 28, further comprising:
rewarding a user of the mobile station in response to a responsive command from the mobile station that indicates a reception of the advertisement by the mobile station.

31. The method of claim 28, further comprising:
establishing a communication link between the mobile station and a telecommunication device associated with an advertiser represented in the advertisement in response to a reception of a contact command indicating a desire of a user of the mobile station for an establishment of the communication link.

32. The method of claim 31, further comprising:
rewarding a user of the mobile station when an establishment of the communication link results in a purchase of a good or a service from the advertiser.

33. The method of claim 28, further comprising:
providing a credit to an account of the user of the mobile station when pushing the advertisement to the mobile station.

34. The method claim 28, further comprising:
determining a location of the mobile station; and
matching a location of an advertiser represented in the advertisement with the location of the mobile station.

35. The method of claim 28, further comprising:
retrieving a user profile corresponding to the mobile station; and
matching a good or a service represented in the advertisement with the user profile.

36. A system, comprising:
a mobile station operable to register with a base station; and
a computer operable to detect a registration of said mobile station with the base station, wherein the computer includes
means for initiating a user preferred schedule for pushing advertisements to said mobile station subsequent to the registration detection,
means for compiling a list of advertisements previously pushed to said mobile station prior to pushing an advertisement to said mobile station, and
means for controlling a push of the advertisement in accordance with the schedule.

37. The system of claim 36, wherein
said mobile station includes means for transmitting a responsive command in response to a reception of the advertisement; and
said computer further includes means for verifying a reception of the advertisement by said mobile station in response to a reception of said responsive command from said mobile station.

38. The system of claim 36, wherein
said mobile station includes means for transmitting a responsive command in response to a reception of the advertisement; and
said computer further includes means for rewarding a user of said mobile station in response to said responsive command from said mobile station.

39. The system of claim 36, wherein
said mobile station includes means for transmitting a responsive command in response to a reception of the advertisement; and
said computer further includes means for establishing a communication link between said mobile station and a telecommunication device associated with an advertiser represented in the advertisement in response to a reception of said responsive command.

40. The system of claim 39, wherein
said computer further includes means for rewarding a user of said mobile station when an establishment of the communication link results in a purchase of a good or a service from the advertiser.

41. The system of claim 36, wherein
said computer further includes means for providing a credit to an account of a user of said mobile station when pushing the advertisement to said mobile station.

42. The system of claim 36, wherein
said computer further includes means for determining a location of said mobile station; and
said computer further includes means for marching a location of an advertiser represented in the advertisement with the location of said mobile station.

43. The system of claim 36, wherein
said computer further includes means for retrieving a user profile corresponding to said mobile station; and
said computer further includes means for matching a good or a service represented in the advertisement with the user profile.

44. A computer program product in a computer readable medium for communicating an advertisement to a mobile station, said computer program product comprising:

computer readable code for detecting a registration of the mobile station with a base station;

computer readable code for initiating a user preferred schedule for pushing advertisements to the mobile station subsequent to the registration detection;

computer readable code for compiling a list of advertisements previously pushed to said mobile station prior to pushing an advertisement to said mobile station; and computer readable code for controlling a push of the advertisement in accordance with the schedule.

45. The computer program product of claim 44, further comprising:

computer readable code for verifying a reception of the advertisement by the mobile station in response to a reception of a responsive command from the mobile station that indicates a reception of the advertisement by the mobile station.

46. The computer program product of claim 44, further comprising:

computer readable code for rewarding a user of the mobile station in response to a responsive command from the mobile station that indicates a reception of the advertisement by the mobile station.

47. The computer program product of claim 44, further comprising:

computer readable code for establishing a communication link between the mobile station and a telecommunication device associated with an advertiser represented in the advertisement in response to a reception of a contact command indicating a desire of a user of the mobile station for an establishment of the communication link.

48. The computer program product of claim 47, further comprising:

computer readable code for rewarding a user of the mobile station when an establishment of the communication link results in a purchase of a good or a service from the advertiser.

49. The computer program product of claim 44, further comprising:

computer readable code for providing a credit to an account of a user of the mobile station when pushing the advertisement to the mobile station.

50. The computer program product of claim 44, further comprising:

computer readable code for determining a location of said mobile station; and computer readable code for matching a location of an advertiser represented in the advertisement with the location of said mobile station.

51. The computer program product of claim 44, further comprising:

computer readable code for retrieving a user profile corresponding to said mobile station; and computer readable code for matching a good or a service represented in the advertisement with the user profile.

* * * * *

UNITED STATES PATENT AND TRADEMARK OFFICE
CERTIFICATE OF CORRECTION

PATENT NO. : 6,889,054 B2  Page 1 of 1
APPLICATION NO. : 09/821134
DATED : May 3, 2005
INVENTOR(S) : Himmel et al.

It is certified that error appears in the above-identified patent and that said Letters Patent is hereby corrected as shown below:

column 7, line 23 should read, "station (not shown), and thus, any corresponding listing of a"

column 11, line 34, should read, "handoff base station;"

column 14, line 58 should read, "said computer further includes means for matching a"

Signed and Sealed this

Fifth Day of September, 2006

JON W. DUDAS
*Director of the United States Patent and Trademark Office*